US005660201A

United States Patent [19]

Turner

[11] Patent Number: 5,660,201

[45] Date of Patent: Aug. 26, 1997

[54] MULTIPLE SOURCE/MULTIPLE TARGET FLUID TRANSFER APPARATUS

[75] Inventor: Terry D. Turner, Idaho Falls, Id.

[73] Assignee: Lockheed Martin Idaho Technologies Company, Idaho Falls, Id.

[21] Appl. No.: 172,515

[22] Filed: Dec. 21, 1993

[51] Int. Cl.$^{6}$ .............................. B08B 9/06; F16K 51/00

[52] U.S. Cl. ...................... 137/240; 134/169 C; 134/171; 137/565; 222/148

[58] Field of Search .................................... 137/240, 597, 137/565; 134/166 C, 167 C, 168 C, 169 C, 171; 239/106, 112, 113, 120; 222/148

[56] References Cited

U.S. PATENT DOCUMENTS

| | | | |
|---|---|---|---|
| 3,219,273 | 11/1965 | Killen | 137/240 |
| 3,373,762 | 3/1968 | Korchak | 137/240 |
| 3,403,695 | 10/1968 | Hopkins | 137/240 |
| 3,458,133 | 7/1969 | Wiggins | 137/240 |
| 3,674,205 | 7/1972 | Kock | 137/240 |
| 3,939,855 | 2/1976 | Wiggins | 137/240 |
| 4,572,230 | 2/1986 | Mirabile | 137/240 |
| 4,582,226 | 4/1986 | Doak | 137/240 |
| 4,869,301 | 9/1989 | Ohmi et al. | 137/240 |
| 4,917,136 | 4/1990 | Ohmi et al. | 137/240 |
| 5,090,440 | 2/1992 | Ladouceur et al. | 137/240 |
| 5,137,047 | 8/1992 | George | 137/240 |
| 5,296,197 | 3/1994 | Newberg et al. | 137/240 |
| 5,343,907 | 9/1994 | Wagner | 137/240 |

OTHER PUBLICATIONS

Cole–Parmer Instrument Company Catalog, 1993–1994, pp. 939–945 and 948–951.

*Primary Examiner*—George L. Walton

*Attorney, Agent, or Firm*—Alan D. Kirsch; Wells St. John Roberts Gregory & Matkin

[57] ABSTRACT

A fluid transfer apparatus includes: a) a plurality of orifices for connection with fluid sources; b) a plurality of orifices for connection with fluid targets; c) a set of fluid source conduits and fluid target conduits associated with the orifices; d) a pump fluidically interposed between the source and target conduits to transfer fluid therebetween; e) a purge gas conduit in fluid communication with the fluid source conduits, fluid target conduits and pump to receive and pass a purge gas under pressure; f) a solvent conduit in fluid communication with the fluid source conduits, fluid target conduits and pump to receive and pass solvent, the solvent conduit including a solvent valve; g) pump control means for controlling operation of the pump; h) purge gas valve control means for controlling operation of the purge gas valve to selectively impart flow of purge gas to the fluid source conduits, fluid target conduits and pump; i) solvent valve control means for controlling operation of the solvent valve to selectively impart flow of solvent to the fluid source conduits, fluid target conduits and pump; and j) source and target valve control means for controlling operation of the fluid source conduit valves and the fluid target conduit valves to selectively impart passage of fluid between a selected one of the fluid source conduits and a selected one of the fluid target conduits through the pump and to enable passage of solvent or purge gas through selected fluid source conduits and selected fluid target conduits.

19 Claims, 5 Drawing Sheets

MULTIPLE SOURCE/MULTIPLE TARGET FLUID TRANSFER APPARATUS

CONTRACTUAL ORIGIN OF THE INVENTION

The United States Government has rights in this invention pursuant to Contract No. DE-AC07-76ID01570 between the U.S. Department of Energy and EG&G Idaho, Inc.

TECHNICAL FIELD

This invention relates to fluid transfer apparatus for transferring fluid between any of a plurality of fluid sources to any of a plurality of fluid targets.

BACKGROUND OF THE INVENTION

Environmental chemistry includes the analysis of soil samples to qualitatively and quantitatively determine presence of contaminants. Current analytical chemistry procedures are very time consuming and labor intensive, and will not realistically meet future needs generated by the U.S. Department Of Energy's environmental restoration and waste management programs.

Accurate soil sample analysis is a critical determination. Before remediation of problem areas can begin, the type and extent of contamination must be determined. Samples to be analyzed must be retrieved from the site and transported to a facility capable of analytical chemistry. The soil sample is processed to remove constituents that are not of interest and to isolate the contaminating substances. Once the sample has been processed and prepared, it is submitted for spectral analysis to determine content and concentration. Now, a trained scientist is required to determine if the concentration levels indicate contamination or are just indicative of background levels. As a precaution, spiked samples are processed with the actual sample. These spiked samples are used to verify that the process is yielding direct results and all must be analyzed the same way.

The protocol that includes all of the tasks from sample retrieval to output of characterization information has been designated as a standard analysis method, or SAM for short. If SAMs could be automated, laboratory technicians would be able to perform analytical analysis in a fraction of the time and cost of conventional prior art methods.

A SAM typically consists of three categories of operations: sample preparation, analysis, and data interpretation. Imbedded within the different areas of the SAM are many smaller tasks, such as weighing the sample or concentrate. Often these steps are repeated several times during the course of a SAM and are common to several SAMs. In accordance with an aspect of this and related inventions, the equipment required to perform individual steps has been developed into automated modules.

Common to many SAMs are filtration and liquid concentration. Further in an automated s) processed fluid will need to be transferred between various SAM g modules. This invention addresses such transfer of fluids between modules. Although this invention spawned from research associated with development of an overall automated process for analyzing test samples in accordance with EPA standards, those skilled in the art will find other uses of the invention which is intended to be limited only by the accompanying claims appropriated interpreted in accordance with the Doctrine of Equivalents.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with the invention, a fluid transfer apparatus for transferring fluid between any of a plurality of fluid sources to any of plurality of fluid targets comprises:

a plurality of fluid source orifices for connection with a plurality of fluid sources;

a plurality of fluid target orifices for connection with a plurality of fluid targets;

a fluid source conduit associated with each fluid source orifice and a fluid target conduit associated with each fluid target orifice;

a valve associated with each fluid source conduit and with each fluid target conduit;

a pump fluidically interposed between the fluid source and fluid target conduits to transfer fluid therebetween;

a purge gas conduit in fluid communication with the fluid source conduits, fluid target conduits and pump to receive and pass a purge gas under pressure, the purge gas conduit including a purge gas valve;

a solvent conduit in fluid communication with the fluid source conduits, fluid target conduits and pump to receive and solvent, the solvent conduit including a solvent valve;

pump control means for operation of the pump;

purge gas valve control means for controlling operation of the purge gas valve to selectively impart flow of purge gas to the fluid source conduits, fluid target conduits and pump;

solvent valve control means for controlling operation of the solvent valve to selectively impart flow of solvent to the fluid source conduits, fluid target conduits and pump; and source and target valve control means for controlling operation of the fluid source conduit valves and the fluid target conduit valves to selectively impart passage of fluid between a selected one of the fluid source conduits and a selected one of the fluid target conduits through the pump and to enable passage of solvent or purge gas through selected fluid source conduits and selected fluid target conduits.

Figure 1:
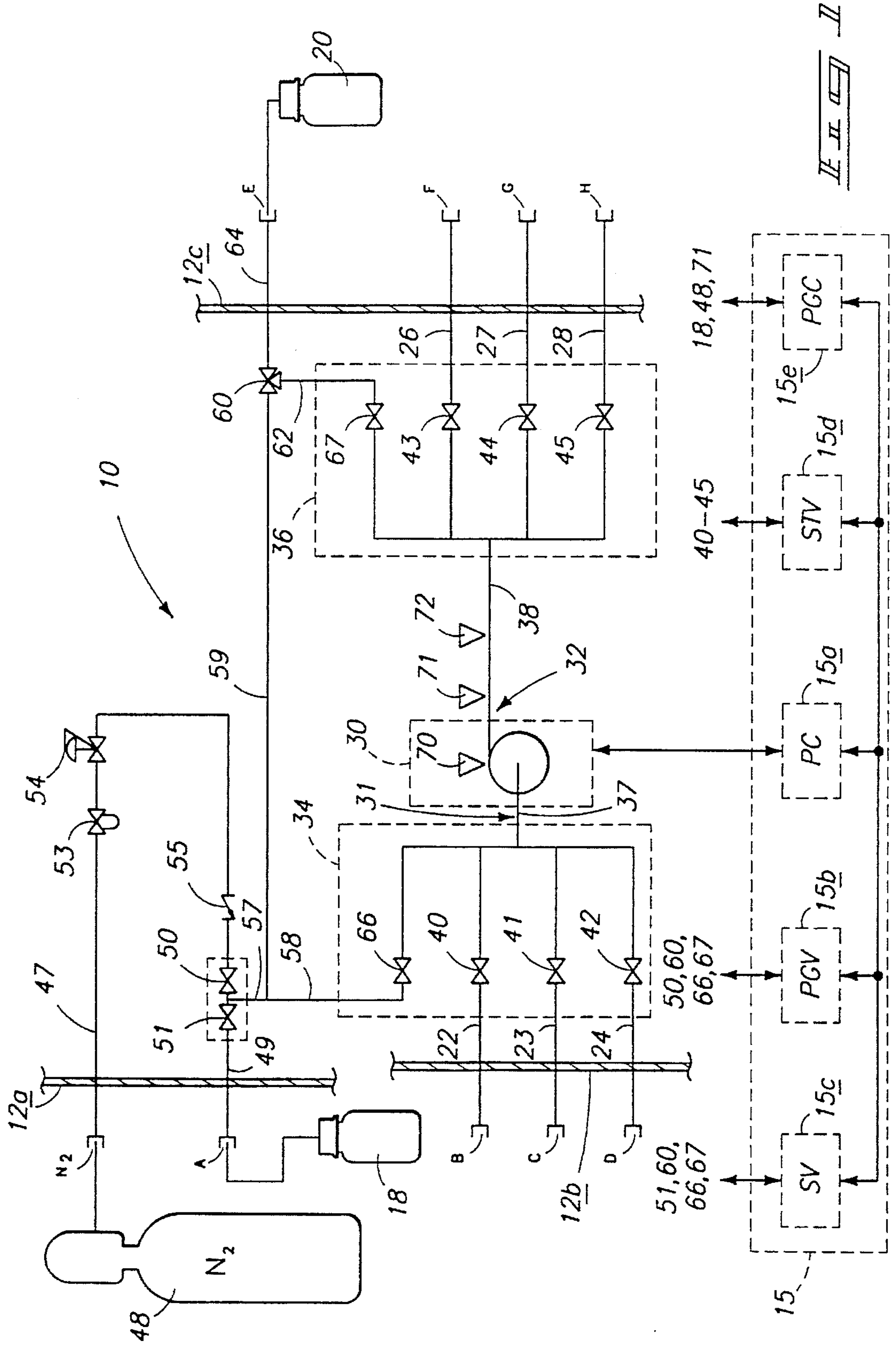
FIG. 1 is a schematic of an apparatus in accordance with the invention.

Aspects of the invention will first be described with reference to the preferred FIG. 1 schematic, with more detailed description of an example preferred embodiment construction subsequently described with reference to FIGS. 2–6. Referring to FIG. 1, fluid transfer apparatus is generally indicated by 10. Lines 12*a*, 12*b* and 12*c* designate apparatus boundaries. Depictions in the drawing to the left of lines 12*a* and 12*b* and to the right of line 12*c* would be external of the apparatus, while depiction between the lines 12*c* and the lines 12*a*, 12*b* would be internal of the apparatus. Control box 15 would also be internal of the apparatus.

A series of external orifices or connections A, B, C, D, E, F, G, H and $N_2$ are as shown. Inputs B, C and D constitute of plurality of fluids source inlets for connection with a plurality of fluid sources. Inlets F, G and H constitute a plurality of fluid target inlets for connection with the plurality of fluid targets. Orifice A constitutes a clean solvent inlet, while orifice E constitutes a dirty solvent outlet. Container 18 constitutes a clean solvent reservoir, while container 20 constitutes a dirty solvent reservoir. A fluid source conduit 22, 23 and 24 is associated with each fluid source orifice B, C and D, respectively. A fluid target conduit 26, 27 and 28 is associated with each fluid target orifice F, G and H, respectively. A pump 30 is fluidically interposed between the fluid source conduits 22, 23 and 24 and fluid target conduits 26, 27 and 28 to transfer fluid therebetween. Pump 30 has a source side fluid pumping connection 31 and a target side fluid pumping connection 32. In the preferred and described embodiment, apparatus 10 constitutes only a single pump 30 in the apparatus for imparting fluid flow between pairs of orifices.

A source manifold 34 is provided into which fluid source conduits 22, 23 and 24 feed. Likewise, a target manifold 36 is provided into which target fluid conduits 26, 27 and 28 feed. Source manifold 34 fluidically joins with pump source side fluid pumping connection 31 via a single conduit 37, while target manifold 36 fluidically joins with pump target side fluid pumping connection 32 via a single conduit 38. Fluid source conduit valves 40, 41 and 42 are associated with respective fluid source conduits 22, 23 and 24. Target source conduit valves 43, 44 and 45 are associated with respective fluid target conduits 26, 27 and 28.

A purge gas conduit 47 is provided in fluid communication with the various fluid source conduits, fluid target conduits and pump to receive and pass a purge gas, such as from a nitrogen gas source 48, under pressure. A solvent conduit 49 is provided in fluid communication with the various fluid source conduits, fluid target conduits and pump to receive and pass solvent. A purge gas valve 50 is included with purge gas conduit 47, while a solvent valve 51 is associated with solvent conduit 49. Valves 50 and 51 are provided as a composite manifold valve. Purge gas conduit 47 further includes a filter 53, pressure regulator valve 54, and a check valve 55.

Downstream of manifold valve 50, 51, conduits 47 and 49 join to a common purge gas and clean solvent conduit 57. Common conduit 57 splits into a first branch 58 which fluidically joins with source manifold 34 and a second branch 59 which fluidically joins with target manifold 36. Second branch 59 includes a three-way valve 60 which branches second branch 59 into a third branch 62 and a fourth branch 64. Third branch 62 fluidically joins with target manifold 36 while fourth branch 64 constitutes a waste solvent conduit extending to orifice E for discharging used solvent outwardly to container 20. Valves 66 and 67 are associated with branches 58 and 62, respectively. As either solvent or purge gas can be controllably provided within conduits 58, 59, 62 and 64, valves 51, 60, 66 and 67 constitute a plurality of solvent valves, while valves 50, 60, 66, and 67 constitute a plurality of purge gas valves.

The various valves and pump of fluid transfer apparatus 10 are controlled by a computer and control subsystem 15. In the preferred embodiment, computer and control subsystem 15 includes a system computer, one or more controllers, and sensors. As will be appreciated by those skilled in the art, the computer and control subsystem 15 can be embodied in the form of a combination of commercially available components (such as microprocessors, microcomputers, application specific integrated circuits [ASICs], microcontrollers, stepper motors, optical sensors, sonic transducer sensors, and other electronics). Most preferably, the system computer is embodied as a standard bus computer system, such as the ZT 8801 single board V40 model manufactured by Ziatech, which is discussed in more detail in the continuing discussion.

Computer and control subsystem 15 includes several interconnected subunits which control the individual components of fluid transfer apparatus 10. Subsystem 15 includes a pump control means (PC) 15*a* which is operatively coupled to control operation of pump 30. A purge gas valve control means (PGV) 15*b* is provided for controlling operation of the purge gas valves to selectively impart flow of purge gas to the fluid source conduits 22–24, fluid target conduits 26–28, and pump 30. Purge gas valve control means 15*b* is illustrated as operatively coupled to purge gas valve 50, but is also operatively coupled to 60, 66, and 67. Computer and control subsystem 15 also has a solvent valve control means (SV) 15*c* for controlling operation of the solvent gas valve to selectively impart flow of solvent to fluid source conduits 22–24, fluid target conduits 26–28, and pump 30. Solvent valve control means 15*c* is illustrated as operatively coupled to solvent gas valve 51, but is also operatively coupled to 60, 66, and 67.

Subsystem 15 includes a source and target valve control means (STV) 15*d* for controlling operation of the fluid source conduit valves 40–42 and the fluid target conduit valves 43–45 to selectively impart passage of fluid between a selected one of the fluid source conduits and a selected one of the fluid target conduits through the pump 30. For example, source and target valve control means 15*d* can operatively open source conduit valve 40 (while maintaining valves 41 and 42 closed) and target conduit valve 44 (while maintaining valves 43 and 45 closed) to enable fluid passage through orifice B, source conduit 22, pump 30, target conduit 27, and orifice G. By controlling valves 40–45, STV 15*d* further enables passage of solvent or purge gas through selected fluid source conduits and selected fluid target conduits.

Purging and cleaning control means (PGC) 15*e* is another subunit of computer and control subsystem 15. The purging and cleaning control means 15*e* is operatively coupled to clean solvent reservoir 18, purge gas source 48, and sensor 71 (described below), as well as the other subunits 15*a*–15*d*. The function of PGC 15*e* is twofold. First, it determines passage of source fluid through a chosen source conduit (22–24) and through a chosen target conduit (26–28) by monitoring bubble sensor 71 and receiving internal signals from the pump control means 15*a* and the source and target valve control means 15*d*. A second function of PGC 15*e* is to impart a series of cleaning solvent and purge gas flows through the chosen source conduit and chosen target conduit to cleanse the used fluid passage. To accomplish this task, PGC 15*e* commands (1) the source and target valve control means 15*d* to select the appropriate conduits; (2) the solvent reservoir 18 or purge gas source 48 to release the appropriate fluids; (3) the solvent valve control means 15*c* to open the appropriate valves for the solvent or the purge gas valve control means 15*b* to open the appropriate valves for the purge gas; and the (4) pump control means 15*a* to begin cycling the solvent or purge gas through the apparatus.

Also shown in FIG. 1 are a series of sensors 70, 71 and 72. Sensor 70 would detect rotation of the pump. Sensor 71 would be a bubble sensor to detect completion of liquid flow through conduit 38. Sensor 72 would sense pressure within conduit 38.

The artisan will recognize that the above described schematic is but one example for carrying out the claimed invention. Other schematics could also be utilized. A more specific, reduction-to-practice embodiment of an apparatus 10*a* in accordance with the above schematic is shown in FIGS. 2–6. Like numbers and letters have been utilized in FIGS. 2–6 from FIG. 1. However, the various conduit/tubing is not shown in FIGS. 2–6 for clarity of layout and construction. Specific description of the construction of apparatus 10*a* of FIGS. 2–6 is presented with respect to the mechanical components (framework, valves, regulators, pump and miscellaneous components); the electrical components (computer, card cage, I/O cards, wiring, etc.); and total system design.

Figure 2:
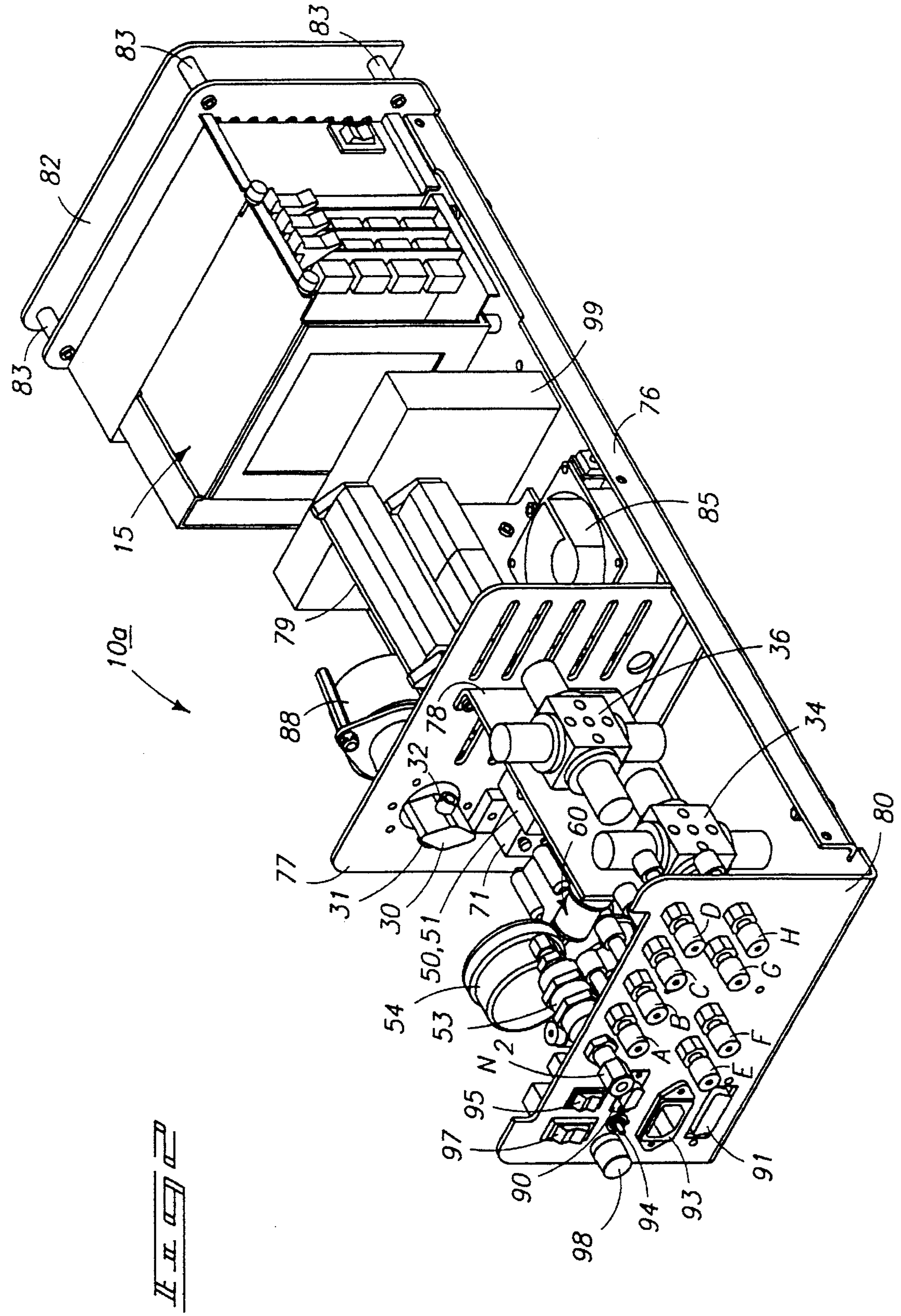
FIG. 2 is an isometric view of an apparatus constructed accordance with the FIG. 1 schematic.
Figure 3:
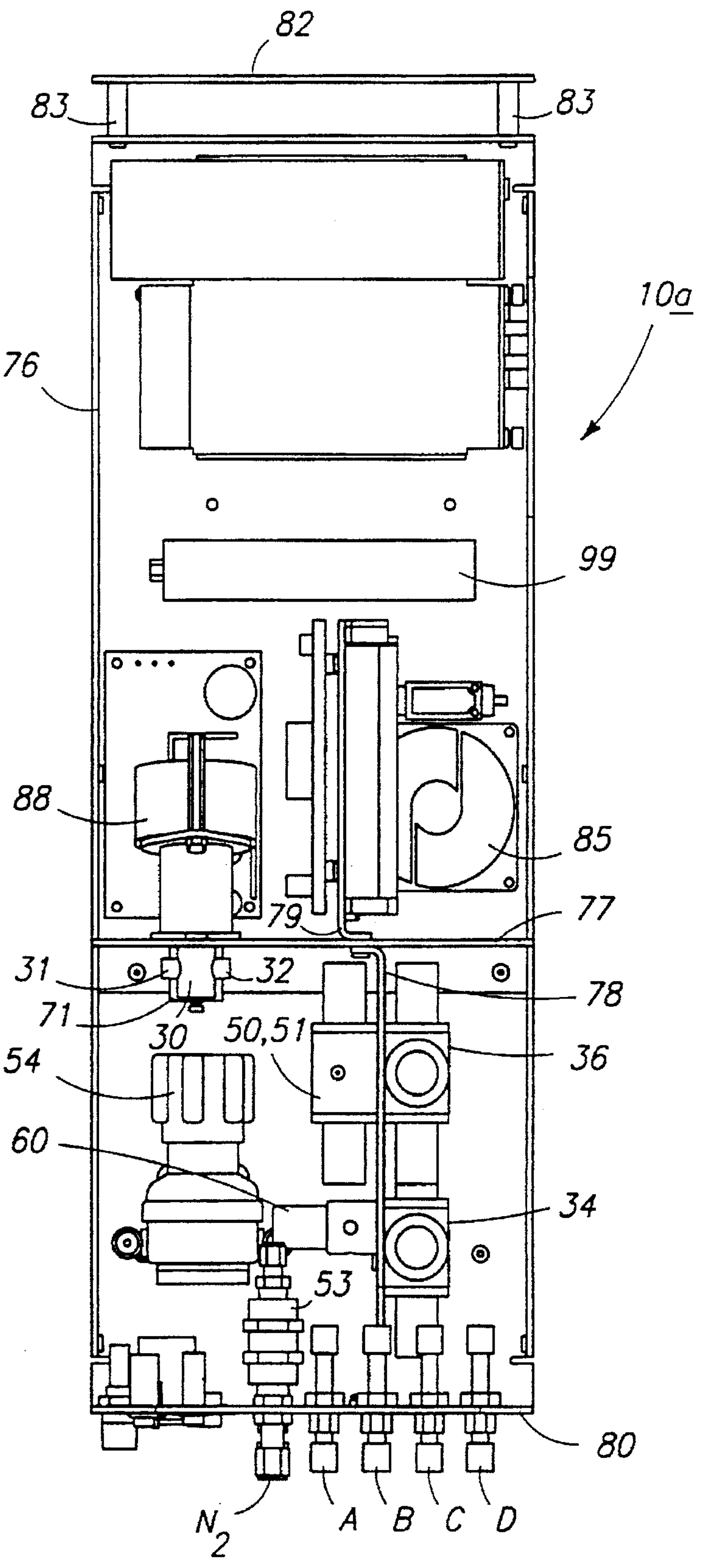
FIG. 3 is a top view of the FIG. 2 apparatus

Apparatus 10*a* includes a base frame 76 and covering frame (not shown) made of 1100 aluminum bent into a desired configuration. Such are designed to have desired stiffness to support the internal components without additional structure. FIG. 2 shows the framework with various dividers, front cover, and regulator bracket. Pem nuts (available from Penn Engineering and Manufacturing Corp. of Danboro, Pa.) are used to improve the ease of assembly.

Three center dividers 77, 78 and 79 are used to support the valves, pump 30, and wiring components. A rear or back upright 80 connects with divider 78 and retains orifice connectors A–H and $N_2$, as well as other switches, data ports and other components. Dividers 77, 78 and 79 add additional rigidity to the framework, especially back upright 80. However, their primary purpose is supporting the major components. The design of the dividers takes into consideration the ease of assembly, and air flow through and around them. Center divider 77 separates the fluid components (rearward toward back plate 80) from the electronics (forward). With the exception of the solenoid valves and sonic transducer sensor 71, all the working electronics are located in front of center divider 77. Electrical connections to the outside world pass through the rear fluid compartment out back plate 80.

On the front of the frame work is a blank plate 82. It is mounted to the base with counter sunk screws and 1 inch standoffs 83. Front cover plate 82 is used to conceal air slots cut in the base frame. It could also be used to mount an alpha-numeric display and touch pad. The 1-inch standoffs 83 between the base and the front plate allow unimpeded air flow out of the cabinet.

Air to cool the components is brought into the framework by a 35 cfm fan 85 located near the center of the framework. Horizontal slots in center divider 77 help control air flow. Slots cut in the front and rear uprights assist in controlling the amount of air flowing in their direction. Front slots are designed to handle 80% of the air flow, with the remaining 20% going out toward the back. The majority of the heat that needs to be removed will come from the computer 15, which is mounted toward the front of the framework.

Gas inlet $N_2$ is supplied as a method of introducing high purity gases into the system. The gas will typically be nitrogen, but others could of course be utilized. Regulator 54 is a brass 51-710B Scott low flow high purity diffusion resistant line regulator (Scott Specialty Gases, Inc. of Plumsteadville, Pa.). It features a Teflon™ lined 301 stainless steel diaphragm, and a low side pressure gauge. The maximum inlet pressure is 3000 psig, and delivery pressure is 30 psig (Vac-O-30 psig). The regulator has an operating temperature range of −40° F. to 220° F. To protect the regulator from particle damage, a filter 53 having an internal 2-micron filter element is located between the inlet port and the high pressure side of the regulator. The filter is a Nupro "FW" series (Nupro Company of Willoughby, Ohio), and features a large element filtration area. It is an all welded construction for leak proof service, and can be easily cleaned by back-flushing. The filter body is 316 stainless steel, and the pleated mesh elements are 304 stainless steel. A brass ball type check valve 55 (not shown in FIGS. 2–6) is located on the low pressure side of the regulator. Its purpose is to permit gas flow in one direction only. The check valve is quick-opening (0.25–1.0 psig) and "bubble-tight" against back pressure. A Viton™ O-ring at the valve seat insures quick and efficient sealing. Copper fittings and tubing connect the filter and regulator. Teflon™ fittings and tubing are used between the regulator and the check valve and between the check valve and distribution valve.

There are four valve assemblies in the transfer module 10*a*. Two are four solenoid manifold valves 34, 36, one is a two solenoid manifold valve 50, 51 and the fourth is a three-way valve 60. All the valves are 24VDC, Teflon™ bodies (Teflon™ wetted parts) with a working pressure of 29" Hg Vacuum to 20 psi, and have ¼–28 ports. The valves are General series 18, except for the three-way which is a series 1.

The tubing used to carry the fluids is FEP Teflon™. It is extruded from all virgin Teflon™, and transparent for easy visual observation of most medias. The physical dimensions are, ⅛ inch outside diameter, with 1/16 inch inside diameter. Length is field fit to achieve the shortest distance between end points and not kink the tubing.

The fluid handling fittings are of two types, the first is an Upchurch fitting (Upchurch Scientific Inc. of Oak Harbor, Wash.), the second is a Furon fitting (Furon of Anaheim, Calif.). The Upchurch fitting is a ¼–28 screw-in design with a flat bottom ferrule. These are used to connect the tubing to the valves. Upchurch fittings provide a zero dead volume between the fitting and the valve body.

Several different styles of Furon fittings are used in module/apparatus 10*a*. These fittings provide the coupling required to connect the tubing to other tubing, such as unions and tee's, or to the outside world through a bulkhead fitting. The Furon fittings were selected for their secure ferrule. The front ferrule seals the line and the second split "Grab-Seal" secures the tubing, and prevents tube blow-out. These fittings are made of PFA Teflon™, and use a Tefzel™ nut.

Pump 30 is made by Fluid Metering, Inc. of Oyster Bay, N.Y. It is a "Living Hinge" or model "STH" metering pump. It features a valveless, positive displacement operation. A stepper motor 88 drives pump 30. Such is an Airpax, North American Philips Controls Corporation, Chesire, Conn., Model MA82616. It provides 15° of revolution per step, a 5-volt coil, 4.6 ohms/coil, and is unipolar with four wire leads. It has a ball bearing design both front and rear. Stepper motor 88 comes installed on the pump 30 supplied by FMI. A valveless pumping function is accomplished by the synchronous rotation and reciprocation of the piston in the precisely mated cylinder bore. One pressure and one suction stroke are completed per cycle. A duct (flat portion) on the piston connects the cylinder ports alternately with the pumping chamber, i.e., one port on the pressure portion of the pumping cycle and the other on the suction cycle. The mechanically precise, free of random closure variation valving is performed by the piston duct motion. The pump head module containing the piston and cylinder is mounted in a manner that permits it to be swiveled angularly with respect to the rotation drive member. The degree of angle controls stroke length and in turn flow rate. The direction of the angle controls flow direction. The reciprocation accuracy and positive valving of the FMI pumps provide exceptional performance and dependability.

The pump head includes a Tefzel™ body which comprises a soft material which can expand under pressure. Pressure is therefore limited to 20–25 psig maximum. Higher pressures will expand the Tefzel body and allow fluids or gases to enter between the ceramic liner and body. The system is designed to be a pass through pumping station, i.e. no pressure build-up. However, in the event pressure does exceed desired limits, a pressure switch monitor will interrupt the computer and corrective actions will be executed to reduce the pressure.

FMI pump flow rates may be altered when operating or at rest. A socket head screw located above the pump head can be turned to reduce or increase the rate. The flow rate is factory set at 0.1 ml/stroke, and no further adjustments are believed to be required. The computer controlling the pump will use this value to determine dispensing quantities when exacting amounts are required. FMI pump accuracy is based on a simplified positive displacement mechanism. The valveless design provides reproducibility of better than 1% when handling medium viscosity fluids (50 to 500 centipoise). Aqueous solutions and light solvents work well but may exhibit some sensitivity (fluid slip) to variations in discharge head pressure. The principal flow rate deviations of an FMI pump are fluid slip and stroke repetition rate. These two factors in turn are related to load factors such as viscosity, differential pressure, and drive motor voltage. When these factors are controlled, the FMI pump will handle most fluids with reproducibility of better than 0.1%.

Some models of FMI pumps are designed for gas metering. However the chosen unit is not. However, running the pump will aid in transferring the gas, and may be necessary to allow timely gas transfer. Gas is dry and can cause cylinder and piston damage if pumped for long periods. The pump should not be run dry more than two minutes to avoid pump damage.

There are three electronic subsystems in the module 10*a*: computer, stepper controller and sensors. There are also miscellaneous parts such as switches, fan, etc. Each of these systems is described below.

A standard (STD) bus computer system 15 was selected for its small size and ability to be programmed through a personal computer. This provides the flexibility to include all the desired computing power inside the module case. A Ziatech (San Luis, Obispol, Calif.) ZT 8801 single board V40, STD Bus computer is used for the processing power. Such includes a NEC V40 processor which is code-compatible with the Intel 8088 CPU, and features an interrupt controller, three counter/timers, and a serial channel integrated with the core processor. The serial channel on the ZT 8801 is configured to RS-232 standards, and is complemented on-board by up to 48 points of digital I/O, an SEX expansion module connector, 512 Kbytes EPROM/Flash, and 1 Mbyte of RAM. The ZT 8801 is supported by Ziatech's STD DOS and STD ROM software environments. Common I/O software support is provided by Ziatech's STD Device Driver Package (STD DDP). A GPIB expansion module is attached to the SBX connector on the ZT 8801 computer card.

There are two I/O STD boards used with the transfer module. The STD boards plug into a VersaLogic (Eugene, Oreg.) VX32-04T, four slot STD 32-bit bus industrial card cage. The STD 32-bit bus accommodates an 8 to 32-bit data path with dynamic bus sizing and can drive up to 32 address lines. Expanded interrupt and DMA modes are also supported. Slot specific signals for a true multiprocessing system with arbitration are provided. The STD 32-card edge connectors and bus are compatible with existing STD 80 cards as well as 114 and 136-finger STD 32 cards.

The backplane used in V32 Series card cages features a 0.093 inch multilayer circuit board which provides controlled impedance, and reduced capacitance signal lines for dependable high speed operation. The multilayer design provides very low impedance paths for supply voltages for negligible supply noise or voltage drop at each card slot.

The STD bus card cage is powered by a VersaLogic VL-PS50 power supply. This is a compact, high efficiency power supply designed specifically for the V32 Series STD bus card cages. It attaches to the right side of the card cage and adds 2.25 inches to the overall width. The VL-PS50 outputs +5 V at 0–6 A, +12 V at 0–2.5 A, 4 A peak, and –12 V at 0–0.5 A. The operation temperatures are 0° to +50° C., full power output, and 50° to +70° C., derated output to 25 W. The mean time between failure (MTBF) is 125,000 hours. The power supply weighs 2 lbs. 10 oz.

The stepper motor controller is an Inland Motor (Radford, Va.) SMC-400 advanced programmable motion controller. Such is powered by a 24 V, 2.5 A unregulated, filtered power supply available from Inland Motors. The controller was selected for ease of start-up, flexibility, low cost, and compact size. It is a standard (full or half-stepping) programmable motion controller with built-in bipolar chopper driver, onboard nonvolatile RAM, and programmable inputs and outputs, and a RS-232C serial interface. The controller utilizes a single power supply (unregulated) for all internal voltages including signal-level voltages. The high-efficiency CMOS logic requires less than 0.3 amp for operation, in addition to the motor current.

The RS-232C compatible serial I/O port (DB-9f) allows command buffer and status to be exchanged at standard baud rates from 75 to 9600. Baud rates are set by the user with a DIP switch. All communications are 8 bit, 1 stop bit, no parity. The interface is also capable of multidrop communication with up to eight controller addresses. There are four general-purpose inputs, and four general-purpose outputs, and three dedicated inputs on the SMC-400 controller. However, such were not utilized in the reduction-to-practice embodiment.

The software features of the SMC-400 include a 64-byte command execution RAM buffer, 512 bytes of nonvolatile memory, power-up defaults, a step counter and an auxiliary step counter. The 512 bytes of nonvolatile memory allows complex command sequences to be programmed and executed. The power-up defaults can be set by the user, and saved into nonvolatile memory.

Three sensors are utilized: pressure sensor switch 72, sonic bubble detector 71, and pump rotational switch 70. Both the pressure switch and bubble detector are located between the FMI pump and the outlet valves. The rotational switch is located on the pump itself.

The Bubble sensor is an Introtek 900-SC24-125 transducer (Introtek International, Edgewood, N.Y.) with E10-3000-125 electronics. It requires 115 VAC and uses a relay output. The ⅛" Teflon™ tubing leaving the pump passes through the transducer, which uses ultrasonics to monitor flow through the tubing. When a bubble passes through the sensor, a signal is generated by closing the relay.

Figure 4:
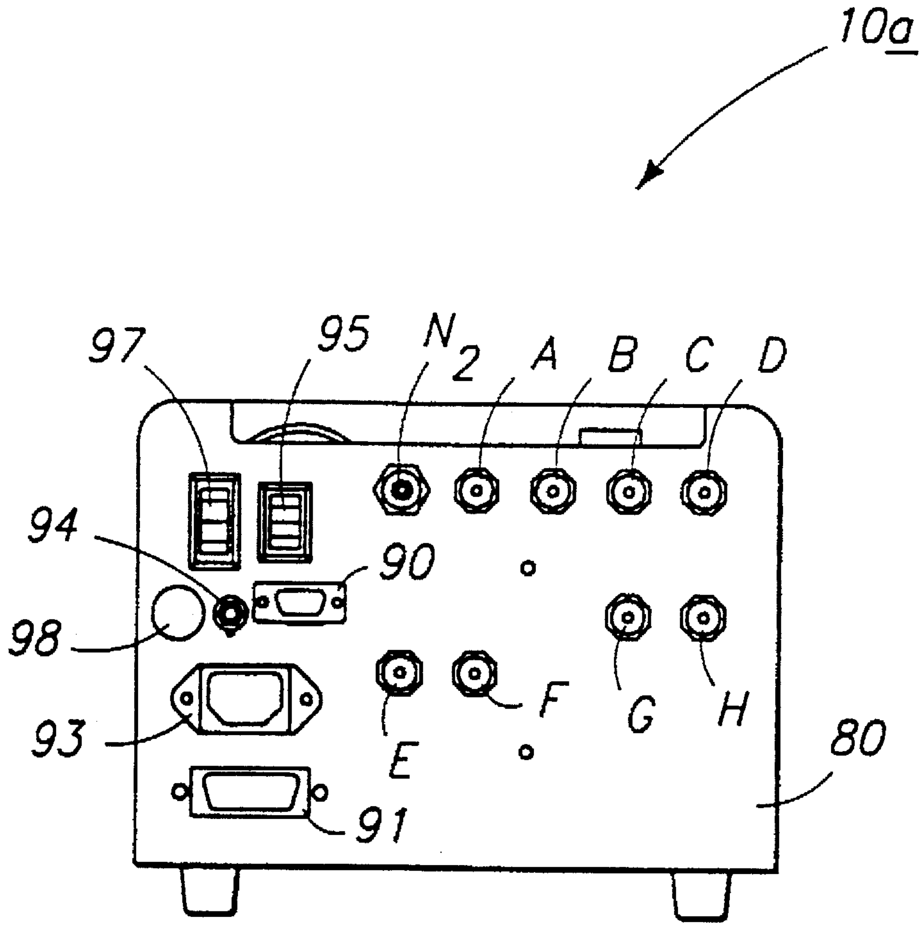
FIG. 4 is a rear elevational view of the FIG. 2 apparatus.
Figure 5:
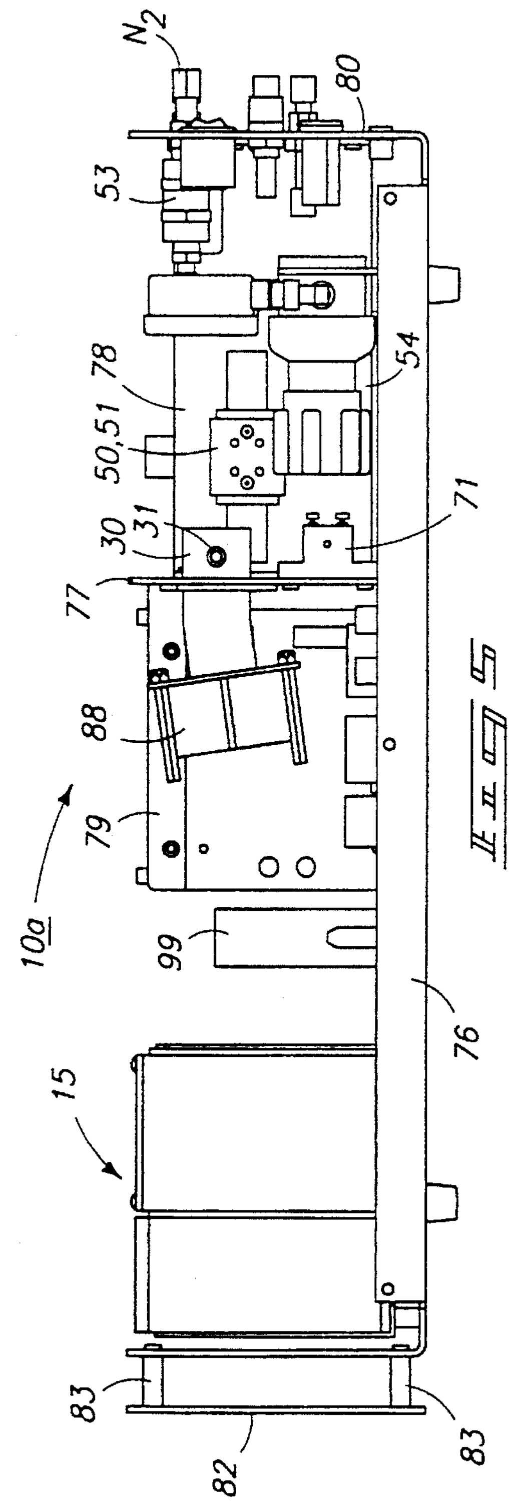
FIGS. 5 and 6 are opposing side elevational views of the FIG. 2 apparatus.
Figure 6:
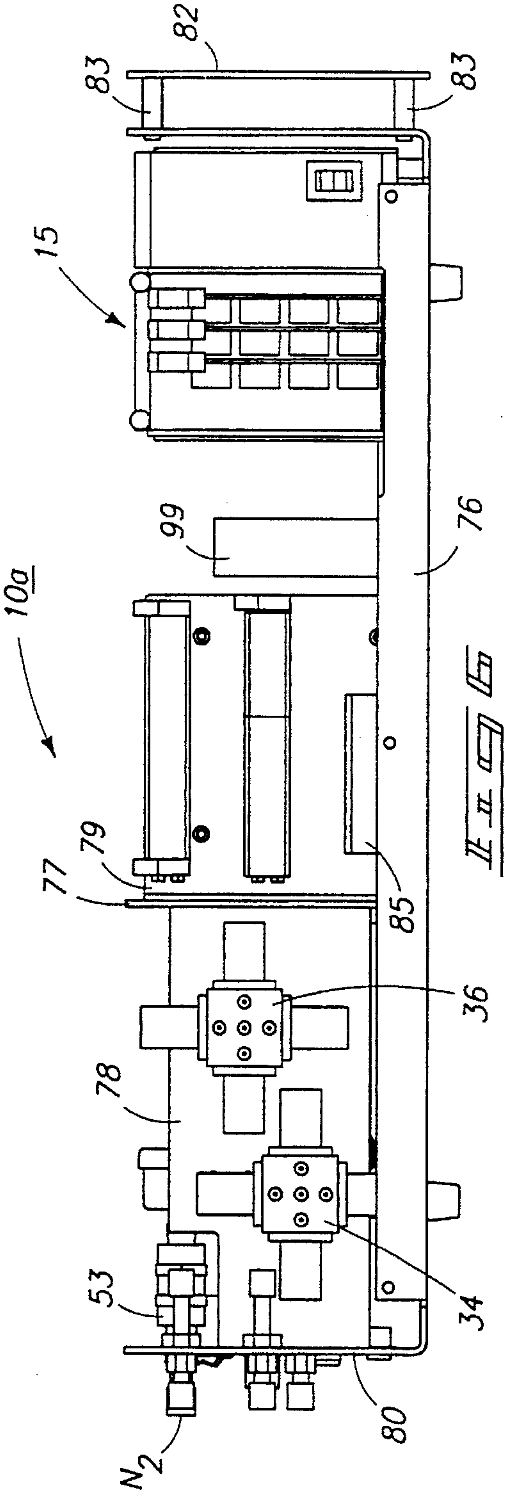

Referring to FIGS. 2 and 4, port 90 constitutes the RS232 port for programming computer 15. The various means of computer 15 will control the internal operations of module 10*a*. A port 91 constitutes a communications port for communication with other external intelligence for directing computer 15 to operate. Receptacle 93 is a 115 VAC power connection. Component 94 is a reset button, while component 95 is a run/program select switch. Item 97 is an on/off power switch and component 98 is a fuse holder.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A chemical sample fluid transfer apparatus for transferring fluid between any of a plurality of fluid sources to any of a plurality of fluid targets, the apparatus comprising:

a plurality of fluid source orifices for connection with a plurality of fluid sources;

a plurality of fluid target orifices for connection with a plurality of fluid targets;

a fluid source conduit associated with each fluid source orifice and a fluid target conduit associated with each fluid target orifice;

a valve associated with each fluid source conduit and with each fluid target conduit;

a pump fluidically interposed between the fluid source and fluid target conduits to transfer fluid therebetween;

a purge gas conduit in fluid communication with the fluid source conduits, fluid target conduits and pump to receive and pass a purge gas under pressure, the purge gas conduit including a purge gas valve;

a solvent conduit in fluid communication with the fluid source conduits, fluid target conduits and pump to receive and pass solvent, the solvent conduit including a solvent valve and clean solvent reservoir;

pump control means for controlling operation of the pump;

purge gas valve control means for controlling operation of the purge gas valve to selectively impart flow purge gas to the fluid source conduits, fluid source orifices, fluid target conduits, fluid target orifices and pump;

solvent valve control means for controlling operation of the solvent valve to selectively impart flow of solvent to the fluid source conduits, fluid source orifices, fluid target conduits, fluid target orifices and pump, and waste solvent reservoir; and source and target valve control means for controlling operation of the fluid source conduit valves and the fluid target conduit valves to selectively impart passage of fluid between a selected one of the fluid source conduits and a selected one of the fluid target conduits through the pump and to enable passage of solvent and purge gas through the entire selected fluid source conduits, selected fluid target conduits and waste reservoir in order to avoid contamination of the chemical sample.

2. The fluid transfer apparatus of claim 1 wherein the total number of pumps in the apparatus is one.

3. The fluid transfer apparatus of claim 1 wherein the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection.

4. The fluid transfer apparatus of claim 1 wherein, the total number of pumps in the apparatus is one; and the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection.

5. The fluid transfer apparatus of claim 1 comprising a plurality of purge gas valves.

6. The fluid transfer apparatus of claim 1 comprising a plurality of solvent valves.

7. The fluid transfer apparatus of claim 1 further comprising purging and cleaning control means for, a) determining passage of source fluid through a chosen source conduit and through a chosen target conduit, and b) imparting a series of cleaning solvent and purge gas flows through the chosen source conduit and chosen target conduit.

8. The fluid transfer apparatus of claim 1 wherein, the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection; and the apparatus further comprising purging and cleaning control means for, a) determining passage of source fluid through a chosen source conduit and through a chosen target conduit, and b) imparting a series of cleaning solvent and purge gas flows through the chosen source conduit and chosen target conduit.

9. The fluid transfer apparatus of claim 1 further comprising a common purge gas and solvent conduit.

10. The fluid transfer apparatus of claim 1 wherein, the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection; and the apparatus further comprising a common purge gas and solvent conduit, the common conduit fluidically joining with the source manifold.

11. The fluid transfer apparatus of claim 1 wherein, the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection; and the apparatus further comprising a common purge gas and solvent conduit, the common conduit fluidically joining with the target manifold.

12. The fluid transfer apparatus of claim 1 wherein, the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection; and the apparatus further comprising a common purge gas and solvent conduit, the common conduit fluidically joining with each of the source manifold and the target manifold.

13. The fluid transfer apparatus of claim 1 wherein, the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection;

the apparatus further comprising a common purge gas and solvent conduit, the common conduit fluidically joining with each of the source manifold and the target manifold; and the apparatus further comprising purging and cleaning control means for, a) determining passage of source fluid through a chosen source conduit and through a chosen target conduit, and b) imparting a series of cleaning solvent and purge gas flows through the chosen source conduit and chosen target conduit.

14. The fluid transfer apparatus of claim 1 wherein, the total number of pumps in the apparatus is one;

the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection;

the apparatus further comprising a common purge gas and solvent conduit, the common conduit fluidically joining with each of the source manifold and the target manifold; and the apparatus further comprising purging and cleaning control means for, a) determining passage of source fluid through a chosen source conduit and through a chosen target conduit, and b) imparting a series of cleaning solvent and purge gas flows through the chosen source conduit and chosen target conduit.

15. The fluid transfer apparatus of claim 1 wherein, the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection;

the apparatus further comprising a common purge gas and solvent conduit, the common conduit including a first branch which fluidically joins with the source manifold and a second branch which fluidically joins with the target manifold; and the second branch including a three-way valve which branches the second branch into third and fourth branches, one of the third and fourth branches fluidically joining with the target manifold, the other of the third and fourth branches connecting with a waste solvent conduit.

16. The fluid transfer apparatus of claim 1 wherein, the total number of pumps in the apparatus is one;

the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection;

the apparatus further comprising a common purge gas and solvent conduit, the common conduit including a first branch which fluidically joins with the source manifold and a second branch which fluidically joins with the target manifold; and the second branch including a three-way valve which branches the second branch into third and fourth branches, one of the third and fourth branches fluidically joining with the target manifold, the other of the third and fourth branches connecting with a waste solvent conduit.

17. The fluid transfer apparatus of claim 1 wherein, the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection;

the apparatus further comprising a common purge gas and solvent conduit, the common conduit including a first branch which fluidically joins with the source manifold and a second branch which fluidically joins with the target manifold;

the second branch including a three-way valve which branches the second branch into third and fourth branches, one of the third and fourth branches fluidically joining with the target manifold, the other of the third and fourth branches connecting with a waste solvent conduit; and the apparatus further comprising purging and cleaning control means for, a) determining passage of source fluid through a chosen source conduit and through a chosen target conduit, and b) imparting a series of cleaning solvent and purge gas flows through the chosen source conduit and chosen target conduit.

18. The fluid transfer apparatus of claim 1 wherein, the total number of pumps in the apparatus is one;

the pump has a source side fluid pumping connection and a target side fluid pumping connection, the apparatus further comprising a source manifold into which the fluid source conduits feed and a target manifold into which the target fluid conduits feed, the source manifold fluidically joining with the pump source side fluid pumping connection, the target manifold fluidically joining with the pump target side fluid pumping connection;

the apparatus further comprising a common purge gas and solvent conduit, the common conduit including a first branch which fluidically joins with the source manifold and a second branch which fluidically joins with the target manifold;

the second branch including a three-way valve which branches the second branch into third and fourth branches, one of the third and fourth branches fluidically joining with the target manifold, the other of the third and fourth branches connecting with a waste solvent conduit; and the apparatus further comprising purging and cleaning control means for, a) determining passage of source fluid through a chosen source conduit and through a chosen target conduit, and b) imparting a series of cleaning solvent and purge gas flows through the chosen source conduit and chosen target conduit.

19. A chemical sample fluid transfer apparatus for transferring fluid between any of a plurality of fluid sources to any of a plurality of fluid targets, the apparatus comprising:

a plurality of fluid source orifices for connection with a plurality of fluid sources;

a plurality of fluid target orifices for connection with a plurality of fluid targets;

a fluid source conduit associated with each fluid source orifice and a fluid target conduit associated with each fluid target orifice;

a valve associated with each fluid source conduit and with each fluid target conduit;

a pump fluidically interposed between the fluid source and fluid target conduits to transfer fluid therebetween, the pump having a source side fluid pumping connection and a target side fluid pumping connection, the apparatus having a total number of pumps, the total number being one;

a source manifold into which the fluid source conduits feed and a target manifold into which the target fluid conduits feed, the source manifold fluidically joining with the pump source side fluid pumping connection, the target manifold fluidically joining with the pump target side fluid pumping connection;

a purge gas conduit in fluid communication with the fluid source conduits, fluid target conduits and pump to receive and pass a purge gas under pressure;

a clean solvent conduit in fluid communication with the fluid source conduits, fluid target conduits and pump to receive and pass solvent;

a waste solvent conduit;

a common purge gas and clean solvent conduit, the common conduit including a first branch which fluidically joins with the source manifold and a second branch which fluidically joins with the target manifold, the second branch including a three-way valve which branches the second branch into third and fourth branches, one of the third and fourth branches fluidically joining with the target manifold, the other of the third and fourth branches connecting with the waste solvent conduit;

pump control means for controlling operation of the pump;

purge gas valve control means for controlling operation of the purge gas valve to selectively impart flow of purge gas to the fluid source conduits, fluid target conduits and pump;

solvent valve control means for controlling operation of the solvent valve to selectively impart flow Of solvent to the fluid source conduits, fluid target conduits and pump;

source and target valve control means for controlling operation of the fluid source conduit valves and the fluid target conduit valves to selectively impart passage of fluid between a selected one of the fluid source conduits and a selected one of the fluid target conduits through the pump and to enable passage of solvent or purge gas through selected fluid source conduits and selected fluid target conduits; and purging and cleaning control means for, a) determining passage of source fluid through a chosen source conduit and through a chosen target conduit, and b) imparting a series of cleaning solvent and purge gas flows through the entire chosen source conduit and chosen target conduit in order to avoid contamination of the chemical sample.

* * * * *